UNITED STATES PATENT OFFICE.

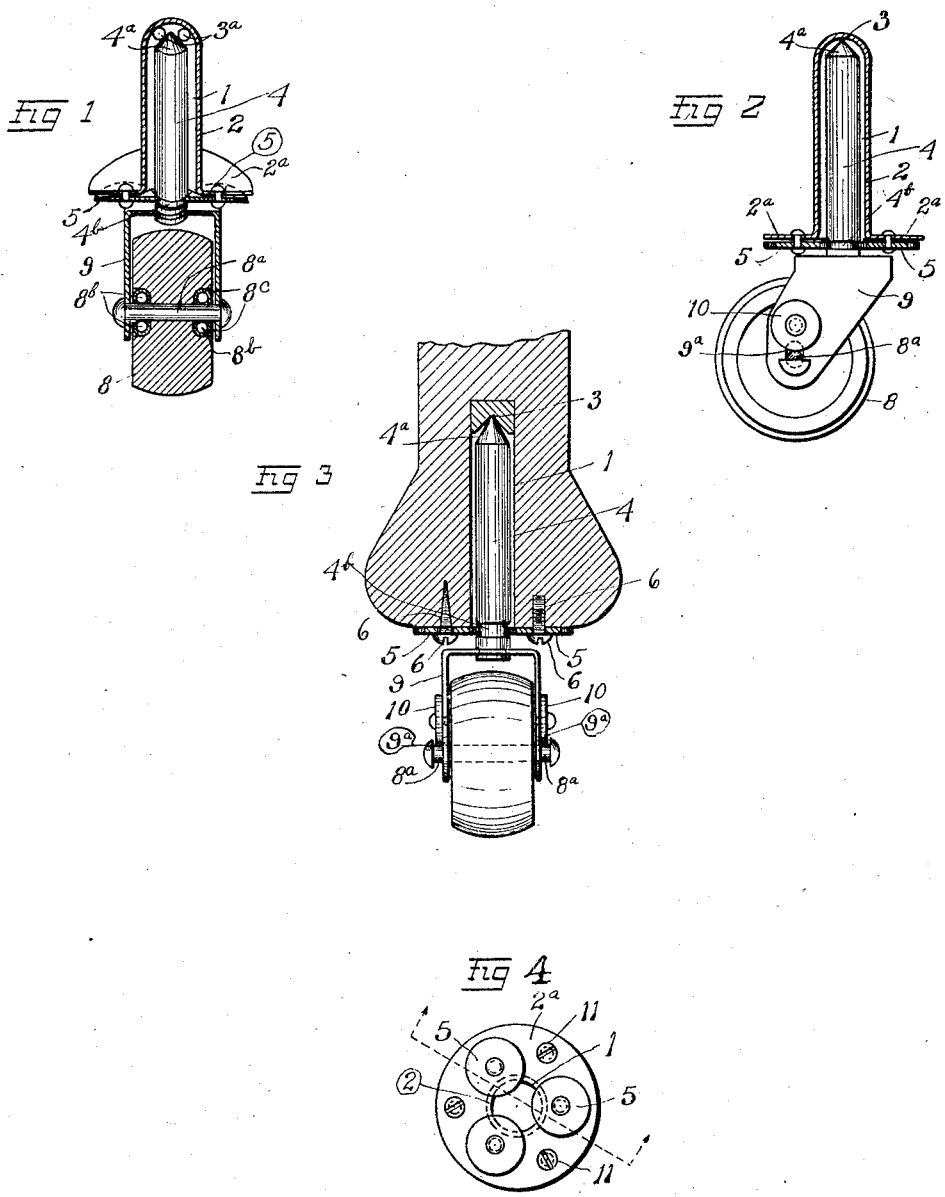

FERDINAND W. STARR, OF SPRINGFIELD, OHIO.

FURNITURE-CASTER.

1,016,300. Specification of Letters Patent. Patented Feb. 6, 1912.

Application filed October 10, 1910. Serial No. 586,191.

*To all whom it may concern:*

Be it known that I, FERDINAND W. STARR, a citizen of the United States, resident at Springfield, in the county of Clark and State of Ohio, have invented certain new and useful Improvements in Furniture-Casters, of which the following is a specification.

My invention relates to improvements in furniture casters, the primary object being to provide a generally improved caster of simple, cheap, and efficient construction, and which by reason of its improved bearings will be better adapted for its intended purposes than any other device of the same class with which I am acquainted.

The improved caster is designed to reduce to a minimum the resistance offered to the swivel action of the caster under the load which it carries.

With this end in view the improvements relate more specifically to improved vertical and lateral anti-friction means adapted to receive and carry the vertical and horizontal stresses incident to the various movements of the caster.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the accompanying drawings, forming a part of this specification, Figure 1, is a sectional view of a caster constructed in accordance with my invention. Fig. 2, a side elevation, partly in section, of a modified form of same. Fig. 3, a view showing the caster applied, and illustrating a modified form of mounting in which the socket member is dispensed with and the vertical and lateral anti-friction means applied directly to the leg or article of furniture to be supported. Fig. 4, a plan view of the underside of the form of socket and lateral anti-friction members shown in Figs. 1, and 2, with the caster stem removed.

Similar numerals of reference designate like parts throughout all the figures of the drawings.

The improved caster comprises a socket provided with vertical and lateral anti-friction means or members, and a caster stem provided with conical and way bearing portions adapted to coöperate with said vertical and lateral anti-friction means, respectively.

The socket 1, may be formed directly in the article to be supported as illustrated in Fig. 3, or by means of a tubular socket member 2, as illustrated in the other figures of the drawings. The socket 1, may be provided with plain bearings 3, as illustrated in Figs. 2 and 3, to receive the vertical thrust of the caster stem 4, or anti-friction bearing members 3$^a$, as illustrated in Fig. 1, of the drawings. The lateral anti-friction means comprises horizontally arranged rotatably mounted friction bearing wheels or disks 5, as illustrated in Figs. 1, 2, 3, and 5, of the drawings.

The improved caster stem 4, is provided at its top with a conical-shaped bearing portion 4$^a$, and at its bottom with an annular or circumferentially extending groove or way bearing portion 4$^b$. The conical-shaped portion 4$^a$, of the caster stem is adapted to be seated in or upon the bearings 3, and 3$^a$, and the improved stem is adapted to be retained within the socket 1, by means of the groove or race-way 4$^b$, in which the lateral anti-friction members 5, are adapted to travel. The lateral anti-friction wheels or members 5, may be attached directly about the socket by means of screws 6, as illustrated in Fig. 3, but they are preferably secured to the rim or flanged portions 2$^a$, of the tubular socket member as illustrated in Figs. 1, 2, and 5, of the drawings.

The caster 8, may have its axle portion 8$^a$, mounted in plain bearings of the bracket head 9, carried by the swiveling caster stem, or the axle portion 8$^a$, may be mounted in ball bearings 8$^b$, arranged in race-ways 8$^c$, as shown in Fig. 1, but I prefer to mount the axle portion or bearing stem 8$^a$, in vertical guide slots 9$^a$, (see Fig. 2), so as to permit the axle bearing portions to rest and travel upon vertically arranged anti-friction wheels or disks 10, vertically mounted upon the bracket members 9.

The tubular socket members 2, may be secured to the article of furniture in any suitable and convenient manner, as for example,—by frictional contact with the socket portion formed to receive the same, or by means of retaining screws 11, passing through suitable openings in the flanged portion 2$^a$, of the socket member as illustrated in Fig. 5, of the drawings.

From the foregoing description, taken in connection with the accompanying drawings, the operation and advantages of my invention will be readily understood.

Having thus described some of the embodiments of my invention, what I claim and desire to secure by Letters Patent is,—

1. A furniture caster, comprising a tubular socket provided with an attaching rim carrying bearing pins, bearing disks journaled on said pins, said disks projecting beyond the inner periphery of said tubular socket, and a caster stem having a race-way receiving the projecting portions of said disks and retaining said stem in said socket.

2. In a furniture caster, a wall provided with a socket and a base, bearing disks horizontally journaled beneath said base and projecting within the mouth of said socket, and a caster stem having a circumferential groove receiving the projecting portions of said disks whereby said stem is retained in said socket.

In testimony whereof I have affixed my signature, in presence of two witnesses.

FERDINAND W. STARR.

Witnesses:
  FRED A. WAGNER,
  O. D. FRANKS.

Copies of this patent may be obtained for five cents each, by addressing the "Commissioner of Patents, Washington, D. C."